(12) United States Patent
Oya

(10) Patent No.: US 7,828,975 B2
(45) Date of Patent: Nov. 9, 2010

(54) APPARATUS FOR TREATING OIL- AND FAT-CONTAINING WASTEWATER AND METHOD OF TREATING OIL- AND FAT-CONTAINING WASTEWATER

(75) Inventor: Takaichi Oya, Aichi (JP)

(73) Assignee: Amano Enzyme Inc., Aichi (JP)

( * ) Notice: Subject to any disclaimer, the term of this patent is extended or adjusted under 35 U.S.C. 154(b) by 275 days.

(21) Appl. No.: 11/919,157

(22) PCT Filed: Apr. 6, 2006

(86) PCT No.: PCT/JP2006/307309

§ 371 (c)(1),
(2), (4) Date: Nov. 19, 2007

(87) PCT Pub. No.: WO2006/117971

PCT Pub. Date: Nov. 9, 2006

(65) Prior Publication Data

US 2009/0301964 A1    Dec. 10, 2009

(30) Foreign Application Priority Data

Apr. 28, 2005  (JP)  .............................. 2005-132022

(51) Int. Cl.
C02F 3/00        (2006.01)
(52) U.S. Cl. .................. 210/606; 210/608; 210/617; 210/632; 210/151; 210/195.1; 210/206; 210/538
(58) Field of Classification Search .................. 210/606, 210/608, 615, 616, 617, 632, 150, 151, 195.1, 210/202, 205, 206, 258, 538
See application file for complete search history.

(56) References Cited

U.S. PATENT DOCUMENTS 4,810,385 A * 3/1989 Hater et al. .................. 210/606

(Continued)

FOREIGN PATENT DOCUMENTS

JP    5-245493    9/1993

(Continued)

*Primary Examiner*—Christopher Upton
(74) *Attorney, Agent, or Firm*—Jordan and Hamburg LLP

(57) ABSTRACT

To provide an apparatus for treating oil- and fat-containing wastewater for the purpose of degrading and treating oils and fats within a grease trap, which has the advantages from the viewpoint of a high versatility, and also from the viewpoints of cost and maintenance, and a method of treating oil- and fat-containing wastewater, which efficiently degrades and treats oils and fats within the grease trap. An apparatus for treating oil- and fat-containing wastewater 100 is an apparatus for treating oil- and fat-containing wastewater which degrades oils and fats of oil- and fat-containing wastewater within a grease trap by the action of immobilized lipase E and a microbe utilizing an organic matter, which comprises a container body 60 having an intake port 61 for incorporating oil- and fat-containing wastewater rich in oils and fats stored in the upper layer within the grease trap which has been absorbed and taken out and an discharge port 62 formed in a way that the wastewater is capable of being removed while part of the wastewater degraded and treated has been remained, an enzyme holder 70 provided and installed within the container body 60 containing the immobilized lipase E while preventing the immobilized lipase E from being flown and lost, in which the above-described oil- and fat-containing wastewater can pass through and agitating means 75 for agitating the above-described oil- and fat-containing wastewater within the above-described container body 60 and it is provided and installed exterior of the grease trap.

5 Claims, 4 Drawing Sheets

U.S. PATENT DOCUMENTS

| | | | | |
|---|---|---|---|---|
| 4,925,564 A | * | 5/1990 | Francis | 210/608 |
| 5,114,586 A | * | 5/1992 | Humphrey | 210/606 |
| 5,171,687 A | * | 12/1992 | Moller et al. | 210/205 |
| 5,516,687 A | * | 5/1996 | Perez et al. | 210/617 |
| 7,537,690 B2 | * | 5/2009 | Oya | 210/150 |
| 2004/0031734 A1 | * | 2/2004 | Chen | 210/150 |

FOREIGN PATENT DOCUMENTS

| | | | |
|---|---|---|---|
| JP | 7-42227 | | 2/1995 |
| JP | 2001-073447 | | 3/2001 |
| JP | 2002-113477 | | 4/2002 |
| JP | 2002-320985 | * | 11/2002 |
| JP | 2003-225652 | | 8/2003 |
| KR | 2006-0110280 | | 10/2006 |

* cited by examiner

APPARATUS FOR TREATING OIL- AND FAT-CONTAINING WASTEWATER AND METHOD OF TREATING OIL- AND FAT-CONTAINING WASTEWATER

FIELD OF THE INVENTION

The present invention relates to an apparatus for degrading and treating oils and fats of oil- and fat-containing wastewater within a grease trap by the action of immobilized lipase and a microbe utilizing an organic matter and a method of treating thereof, and particularly it relates to an apparatus for taking out oil- and fat-containing wastewater rich in oils and fats stored in the upper layer within the grease trap, and degrading and treating it by the action of the immobilized lipase and a microbe utilizing an organic matter and a method of treating thereof.

BACKGROUND OF THE INVENTION

Background Art

Since wastewater discharged from a kitchen such as a feeding center, a restaurant and the like, a meat center, a food/finish processing factory contains oils and fats of animals and plants, the treatment of it is essential, in a feeding center and the like, the oil- and fat-containing wastewater discharged from the kitchen is flown into a measure which is called as a grease trap via a flow input pipe, oils and fats contained in the oil- and fat-containing wastewater stored in the upper portion is periodically suctioned, and the flowing out of the waste oils and fats to the sewage or the like are prevented. On the other hand, as for the suctioning work of oils and fats, since it is accompanied with bad odor, insanitary, and the working environment is inferior, and besides these, the cost is high, there have been proposals for the purpose of avoiding the suctioning work by utilizing a microbe and an enzyme, for example, there has been a proposal relating to a grease trap which is equipped with a treatment section of oils and fats for degrading oils and fats by utilizing an oils and fats degrading bacteria or an oils and fats degrading enzyme (see Patent Reference 1). However, since a large number of grease traps have been already popular among the domestic facilities, the proposal of a method or an apparatus of degrading and treating oils and fats on the presupposition that these existing grease traps are put into practical use as they are is economical and effective. Then, the applicant of the present invention has proposed an apparatus for treating oil- and fat-containing wastewater for a grease trap 50 shown in FIG. 4 as an apparatus satisfying the above-described conditions (Japanese Patent Application No. 2003-374908). This apparatus 50 is equipped with a supporting plate 10 mounted on the grease trap, an immobilized enzyme holder 20 containing the immobilized enzyme E in which the oil- and fat-containing wastewater can freely pass through and an agitating means 30 for agitating the oil- and fat-containing wastewater, and in which the above-described immobilized enzyme holder 20 and the above-described agitating means 30 are provided and installed on the above-described supporting plate 10.

[Patent Reference 1: JP, 2001-73447, A]

However, since the apparatus shown in FIG. 4 has the configuration in which it is directly mounted on the grease trap, if it is made to correspond with a variety of grease traps, a variety of apparatuses are required to be designed and manufactured, and it was not suitable for the mass production and it was not advantageous from the viewpoint of cost. And since it is directly mounted on the grease trap, the apparatus becomes in a large scale, there have been points not preferable because the maintenance is troublesome and also from the sanitary viewpoint. Moreover, although the apparatus can degrade oils and fats into fatty acid and glycerin at a high degradation rate by utilizing an immobilized lipase, since there are oils and fats which have been not degraded and besides these, fatty acid is also extracted to n-hexane, therefore, the content of n-hexane extract was not easily reduced.

An object of the present invention is to provide an apparatus for treating the oil- and fat-containing wastewater which can degrade and treat oils and fats within a grease trap into carbon dioxide gas and water, has a high versatility, and is also advantageous from the viewpoints of cost and maintenance and a method of treating discharged water containing oils and fats which can efficiently degrade and treat oils and fats within the grease trap into carbon dioxide gas and water.

DESCRIPTION OF THE INVENTION

The present invention is contemplated as a treatment apparatus for treating oil- and fat-containing wastewater, which degrades and treats the oils and fats of the oil- and fat-containing wastewater within a grease trap by utilizing the action of an immobilized lipase and a microbe utilizing an organic matter, and which is equipped with a container body having an intake port for incorporating the oil- and fat-containing wastewater rich in oils and fats stored in the upper layer within the grease trap, which has been absorbed and taken out and an discharge port formed in a way the water degraded and treated can be discharged while part thereof is retained, an enzyme holder provided and installed within the container body and containing an immobilized lipase while preventing it from being flown and lost in which the above-described oil- and fat-containing wastewater can freely pass through and an agitating means for agitating the above-described oil- and fat-containing wastewater within the above-described container body and it is provided and installed exterior of the grease trap.

Since in the invention having the above-described configuration that it absorbs only the oil- and fat-containing wastewater rich in oils and fats is absorbed to be taken out to the exterior of the grease trap and then degraded and treated by utilizing an immobilized lipase and a microbe, the volume of the treatment becomes slight and the apparatus can be minimized, and oils and fats contained in the oil- and fat-containing wastewater can be efficiently treated into carbon dioxide gas and water. Moreover, since the wastewater can be discharged while part of the wastewater containing the microbe which has been degraded and treated is retained, the microbe remained in the wastewater can be grown and activated and repeatedly utilized.

Moreover, in the above-described invention, the agitating means may be also available for agitating the oil- and fat-containing wastewater within the enzyme holder. By this configuration, the oils and fats and the immobilized lipase become likely to contact each other, and the degradation ratio can be enhanced. Moreover, in the above-described invention, it may be also equipped with the absorbing means for absorbing the oil- and fat-containing wastewater rich in oils and fats stored in the upper layer within a grease trap. By this configuration, oils and fats within a grease trap can be efficiently degraded and treated. Moreover, in the above-described invention, the absorbing means comprises a containing housing having an opening at the upper portion disposed within the grease trap, an absorbing pump provided and contained within the containing housing and an oil- and fat-containing wastewater collection container having an opening at the upper portion communicating with the above-described containing housing, and the upper end of the above-described containing housing and the upper end of the above-described oil- and fat-containing wastewater collection container may be disposed at the predetermined position of the lower layer of the oil- and fat-containing wastewater rich in the oils and fats to be absorbed. By this configuration, only the oil- and fat-containing wastewater rich in oils and fats can be efficiently and selectively absorbed. Furthermore, in the above-described invention, it may be equipped with the air diffusing means and/or the heating means. By this configuration, the growth and activation of a microbe and an immobilized lipase can be enhanced.

The present invention is contemplated to provide a method of treating oil- and fat-containing wastewater in which the oil- and fat-containing wastewater rich in oils and fats stored in the upper layer within a grease trap is absorbed and taken out, the oil- and fat-containing wastewater is incorporated into an apparatus whose main body is a container provided to the exterior of the grease trap, oils and fats of the above-described oil- and fat-containing wastewater is degraded and treated by making an immobilized lipase which is not flown and lost since it is contained within the enzyme holder provided to the apparatus and an microbe utilizing an organic matter introduced into the above-described container act and the wastewater after it has been degraded and treated is discharged while part of the wastewater is remained within the above-described apparatus.

In the above-described invention, the wastewater after it has been degraded and treated may be returned within the grease trap, and discharged to the sewage or the like via the grease trap. In the above-described invention, the apparatus may be the above-described oil- and fat-containing wastewater treatment apparatus.

Since an oil- and fat-containing wastewater treatment apparatus of the present invention selectively absorbs only the oil- and fat-containing wastewater rich in oils and fats and takes it out to the exterior of the grease trap, which is degraded by utilizing an immobilized lipase and an microbe utilizing an organic matter, it has a high versatility, can correspond with a variety of grease traps, and the cost is capable of being reduced by the mass production. Moreover, since it is provided not within the grease trap but to the exterior thereof, and it is minimized, it is not necessary to perform the maintenance workings under the insanitary environment within the grease trap and it is advantageous to the maintenance. Since an apparatus for treating oil- and fat-containing wastewater treatment apparatus of the present invention degrades oils and fats by utilizing an immobilized lipase and an microbe, it can be degraded and treated at a higher degradation ratio and in a shorter treatment time comparing to the case where only an microbe is used, and n-hexane extract content can be contemplated to be improved. Furthermore, since the immobilized lipase is not flown and lost from the enzyme holder and the remaining microbe can be used by performing the growth and activation of it per each treatment process, the frequent refills of the immobilized lipase and the microbe is not required, and the economy from the viewpoint of maintenance management is superior.

Since an absorbing apparatus of the present invention can selectively absorb only the oil- and fat-containing wastewater rich in oils and fats of the grease trap, it can be utilized for efficient degradation and treatment of the oils and fats within the grease trap.

Since a method of treating oil- and fat-containing wastewater of the present invention takes out only the oil- and fat-containing wastewater rich in oils and fats by performing the absorption to the exterior of the grease trap and degrades it by utilizing an immobilized lipase and an microbe, the oils and fats within the grease trap can be securely and efficiently degraded and treated.

BEST MODE FOR CARRYING OUT THE INVENTION

Figure 1:
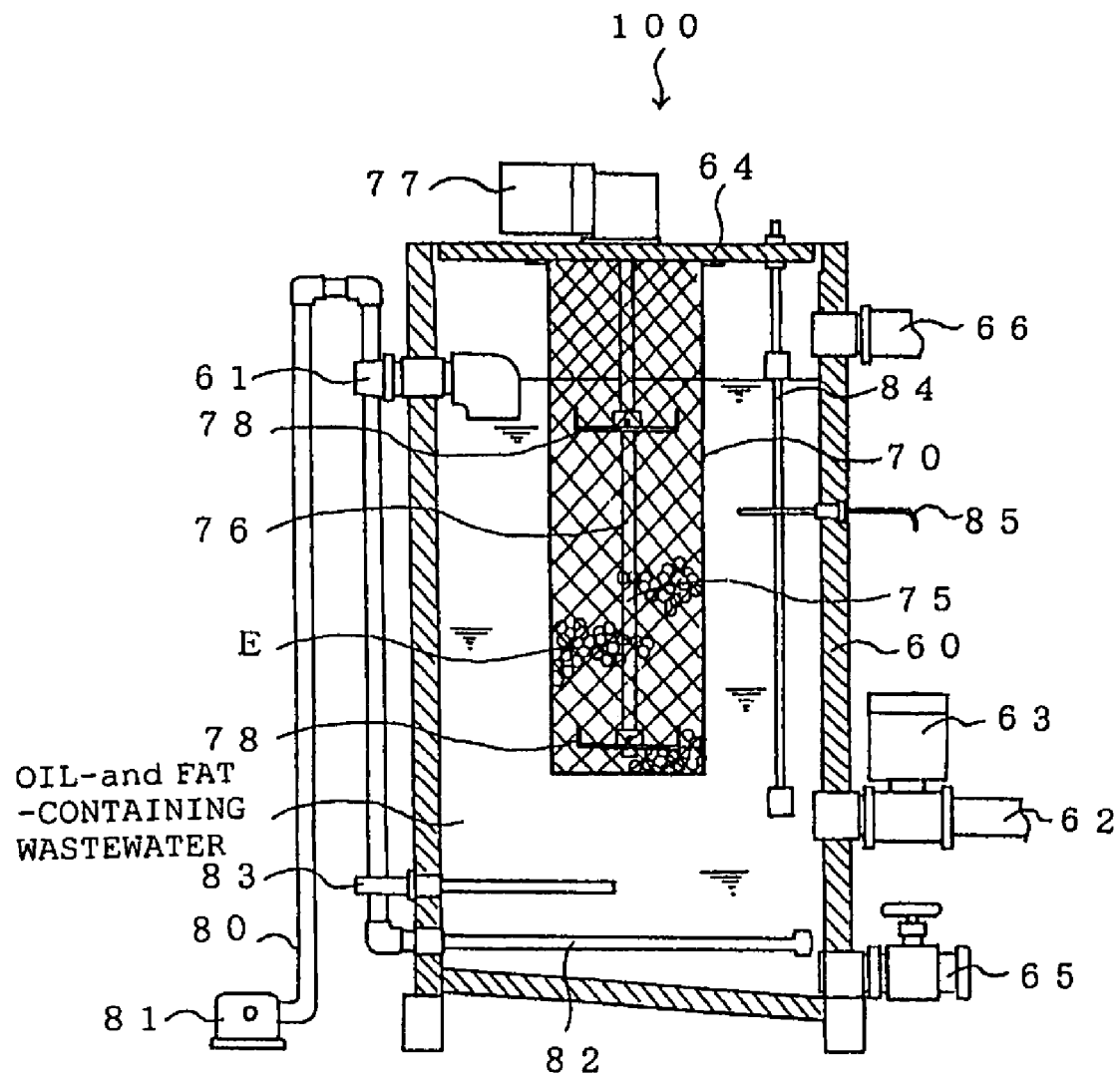
FIG. 1 is a schematic cross sectional view of an apparatus oil- and fat-containing wastewater pertaining to the mode for carrying out the invention.
Figure 2:
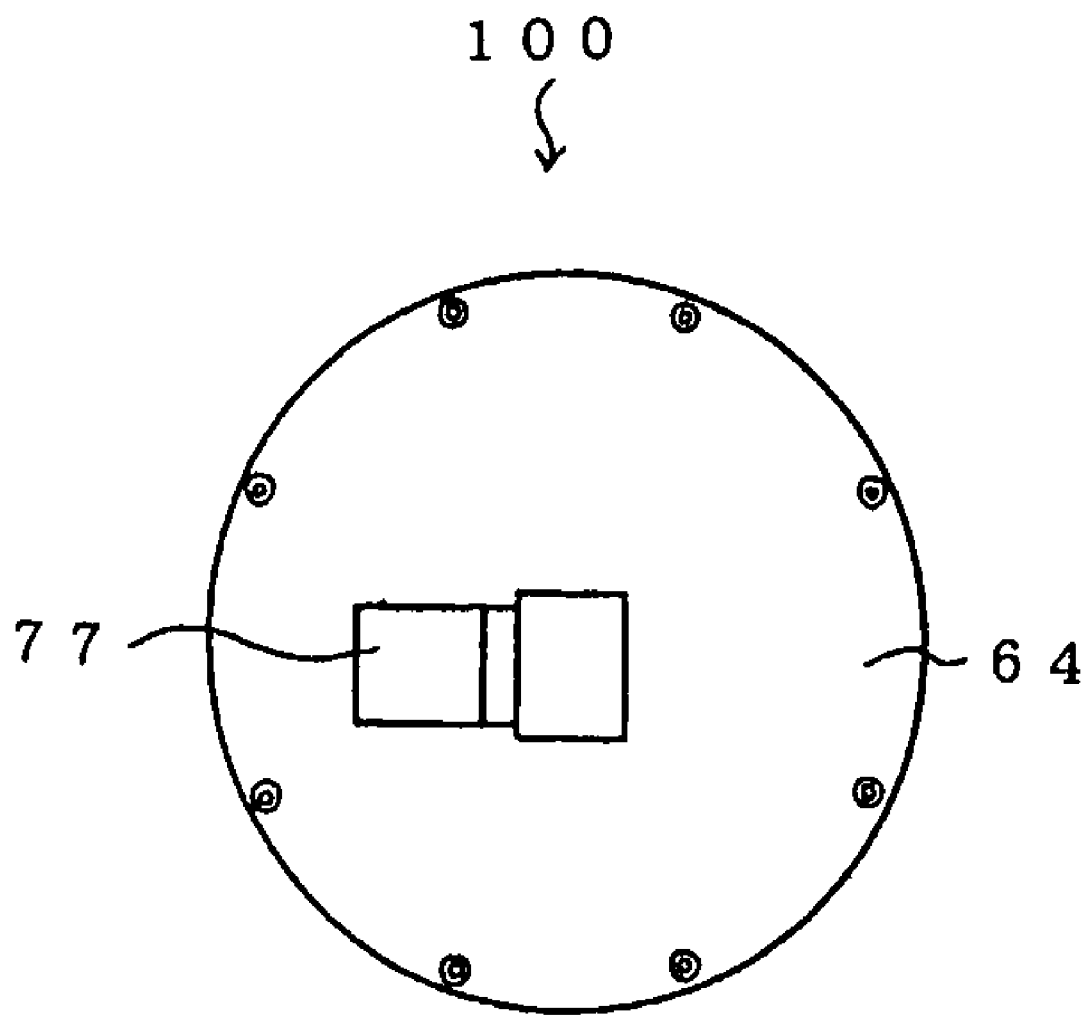
FIG. 2 is a plane view of an apparatus for treating oil- and fat-containing wastewater pertaining to the mode for carrying out the invention.
Figure 3:
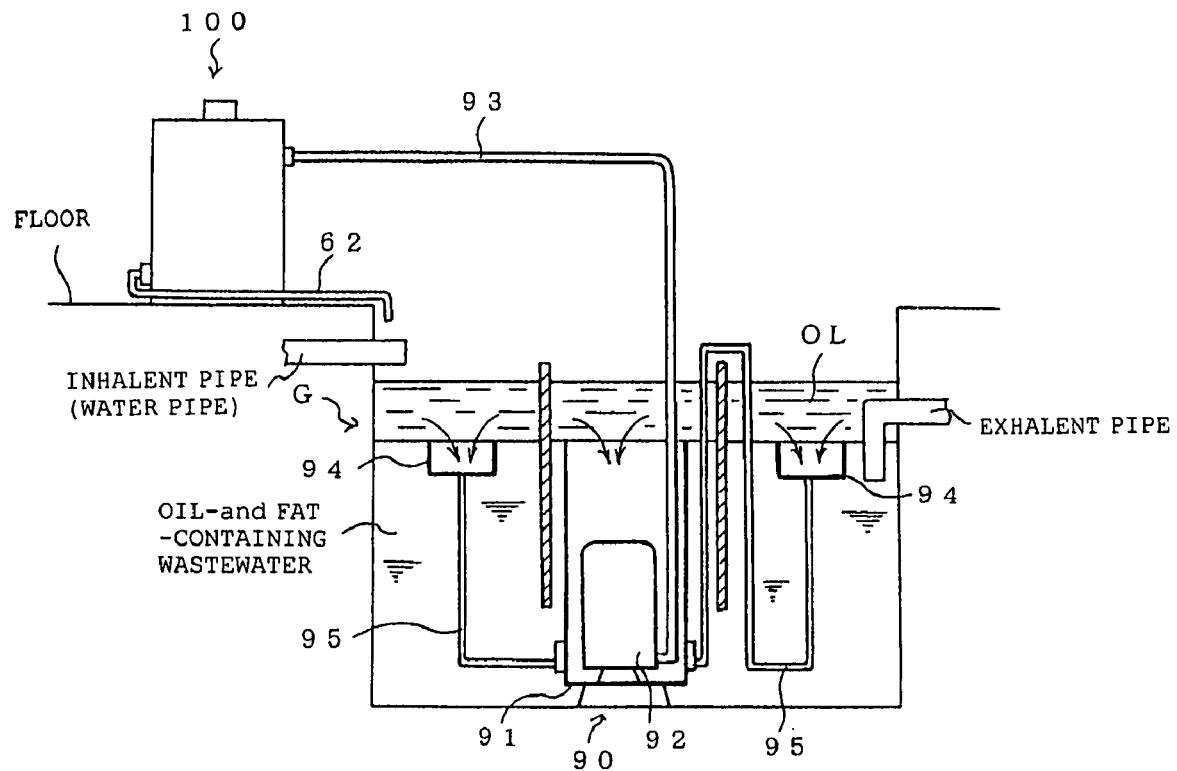
FIG. 3 is an illustrative drawing of the usage situation of an apparatus for treating oil- and fat-containing wastewater, and an absorbing apparatus pertaining to the mode for carrying out the invention.
Figure 4:
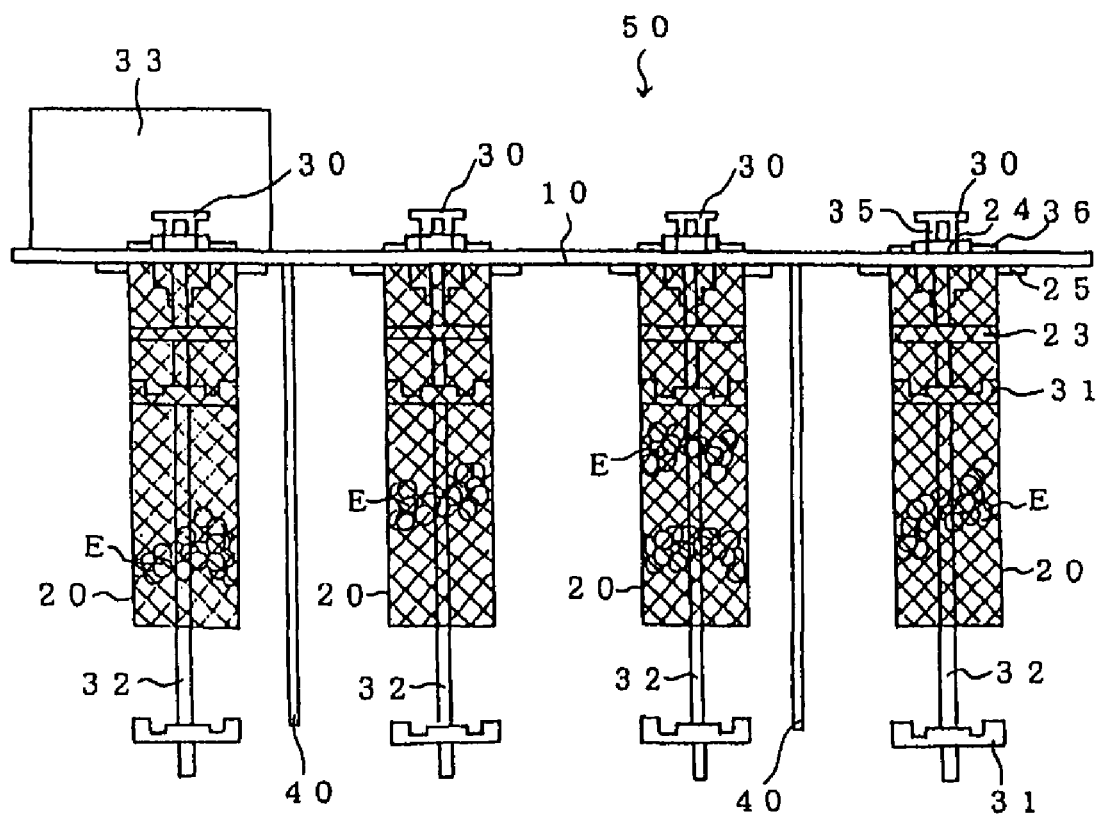
FIG. 4 is an elevational view of the conventional apparatus for treating oil- and fat-containing wastewater.

Although the apparatus for treating oil- and fat-containing wastewater 100 (hereinafter, referred to as "the present apparatus") will be explained in detail with reference to the drawings by modes for carrying out the invention, the present invention is not limited to the modes for carrying out the invention. FIG. 1 is a schematic cross sectional view of the present apparatus 100, FIG. 2 is a plane view of the present apparatus 100. Moreover, FIG. 3 is an illustration drawing showing the usage situation of the present apparatus 100 and an absorbing apparatus.

The present apparatus 100 comprises the container body 60, the enzyme holder 70, the agitating apparatus 75, the aeration apparatus 80 and the heater 83, and it has been disposed in the exterior of the grease trap G. As shown in FIG. 1, the container body 60 is configured with a container having the bottom in a cylinder shape in which the upper portion is opened. At the upper portion of the container body 60, the intake port 61 for incorporating oil- and fat-containing wastewater rich in oils and fats absorbed and taken out from the grease trap G has been formed and at the position of about ⅓ height of the whole container body from the lower end of the container body 60, the discharge port 62 for discharging the wastewater degraded and treated has been formed. To the intake port 61, the apex portion of the water pipe 93 of the underwater pump 92 described later is capable of being connected. Moreover, the discharge port 62 is regulated by the opening and closing by the electromagnetic valve 63. On the opening located at the upper portion of the container body 60, the cover body 64 having a through hole at the center portion has been mounted in a way that it can be freely attached and detached. Moreover, in the interior of the container body 60, an insulating material has been interiorly provided and installed, and a stainless plate has been interiorly lined.

As far as the enzyme holder 70 prevents the immobilized lipase E to be introduced from being flown and lost and the oil- and fat-containing wastewater can freely pass therethrough, the configuration is not limited, but it is preferable that it is in a net body in a cylinder shape. In this case, it is preferable that the size of mesh of the net body is in the range from 8 to 14 mesh, and it is more preferable that it is in the range from 10 to 12 mesh. Since in the case where the size of mesh is smaller than 8 mesh, the oil- and fat-containing wastewater does not easily and freely pass through it, and in the case where it is larger than 14 mesh, there is a fear that the immobilized lipase E is flown and lost from the net body. Moreover, it is preferable that the average particle diameter of the immobilized lipase E is in the range from 1 to 8 mm, and it is more preferable that it is in the range from 2 to 4 mm. In the case where the average particle diameter of the immobilized lipase E is smaller than 1 mm, from the relationship with the size of the mesh of the above-described net body, there is a fear that it is leaked, and in the case where it is larger than 8 mm, the whole surface area of the immobilized lipase E becomes smaller and becomes unlikely to contact with the oil- and fat-containing wastewater, and subsequently, the degradation ratio of the oils and fats are lowered. Moreover, it is preferable that the bulk specific gravity of the immobilized lipase E is in the range from 0.15 to 0.2 and it is more preferable that it is in the range from 0.16 to 0.18. In the case where the bulk specific gravity of the immobilized lipase E is smaller than 0.15, the immobilized lipase E is often unevenly distributed and floats at the upper portion of the enzyme holder 70, and there is a fear that it becomes likely to contact with the oil- and fat-containing wastewater becomes bad and in the case where the bulk specific gravity is larger than 0.2, the immobilized lipase E is often unevenly distributed and floats at the lower portion of the enzyme holder 70, there is also a fear that it becomes likely to contact with the oil- and fat-containing wastewater.

The enzyme holder 70 in the present mode for carrying out the invention has been configured with a net body made of stainless steel in a cylinder shape, and the size of the mesh has been formed in 10 mesh. As for the enzyme holder 70, a flange formed at the upper portion has been mounted on the lower surface of the cover body 64 in a way that it is capable of being attached and detached.

The origin of lipase in the immobilized lipase E explained above is not particularly limited, but it is preferable that lipase that Candida rugosa or strains belonging to Pseudomonas cepacia which is excellent in degradation ability of oils and fats produces is used. Moreover, the immobilizing an enzyme can be performed according to a known method. Specifically, it can be performed by a method of binding carrier in which an enzyme is bound to an insoluble carrier (a physical absorption method, an ion binding method and a covalent binding method), a crosslinking method, an inclusive method or the like.

In the present apparatus 100, an agitating apparatus 75 corresponding to the agitating means has been provided and installed. On the upper surface side of the cover body 64, the cross flow motor 77 driving an agitating rod 76 has been mounted. The relevant agitating rod 76 is penetrated through the through hole formed on the cover plate 64, and it is made so that it can rotate within the enzyme holder 70. Moreover, on the agitating rod 76, two sites of the upper portion and the lower portion, an agitating blade 78 has been provided and installed.

Moreover, in the present apparatus 100, an aeration apparatus 80 corresponding to the air diffusing means. The aeration apparatus 80 comprises an air pump 81 and an air discharge pipe 82 connected to the air pump 81. The air discharge pipe 82 is provided and installed at the lower portion of the container body 60, and air is supplied to the oil- and fat-containing wastewater within the present apparatus 100. Nearby the air discharge pipe 82, a heater 83 is provided and installed and the regulation of the temperature is performed by a temperature sensor 85 provided and installed in the present apparatus 100. Moreover, in the present apparatus 100, a liquid level sensor 84 has been provided and installed.

At the lower portion of the discharge port 62, a discharge port for maintenance 65 which is freely opened and closed by a drain valve has been formed. On the bottom portion of the container body 60, the taper gradually being lowered towards the discharge port for maintenance 65 has been formed. Moreover, at the upper portion of the container body 60, a discharge port for emergency 66 corresponding to the overflow of the oil- and fat-containing wastewater absorbed from the grease trap G has been formed.

A microbe used in the present apparatus 50 is not limited if it can utilize an organic matter, an aerobic microbe, an anaerobic microbe, a plurality of microbes mixed, a microbe preparation which is available in the market may be used.

Moreover, oils and fats degraded by the action of the immobilized lipase and a microbe are not particularly limited, and canola oil, olive oil, safflower oil, corn oil, sesame oil, rice oil, salad oil, lard oil, shortening, Econa (registered trade mark) and the like can be exemplified.

Subsequently, a method of utilizing the present apparatus 100 configured as described above, the action of the apparatus and an absorbing apparatus 90 will be explained. The immobilized lipase E and the microbe are introduced within the enzyme holder 70 and into the present apparatus 100, respectively. Then, when the main switch is turned ON, the absorbing apparatus 90 is actuated to absorb only the oil- and fat-containing wastewater rich in oils and fats by the amount in the range between ¼ and ⅓ of the entirety downward from the upper surface out of the layers of the oil- and fat-containing wastewater stored in the grease trap G shown in FIG. 3. Most of oils and fats rich in oils and fats within the grease trap G can be selectively taken out and incorporated into the present apparatus 100 by absorbing the oil- and fat-containing wastewater in the range between ¼ and ⅓ of the entirety downward from the upper surface of the grease trap G. The absorbing apparatus 90 comprises the containing housing 91 that is disposed within the grease trap G and that has an opening at the upper portion, an underwater pump 92 provided within the containing housing 91 and an oil- and fat-containing wastewater collection container 94 having an opening at the upper portion communicating with the containing housing 91 via a collection pipe 95 whose one end is connected to the bottom portion, and the other end is connected to the containing housing 91. The upper end of the containing housing 91 and the upper end of the oil- and fat-containing wastewater collection container 94 are disposed at the lower layer position of the oil- and fat-containing wastewater layer (OL) in the range between ¼ and ⅓ downward from the upper surface of the grease trap G rich in oils and fats. Since the grease trap G has a configuration in which the oil- and fat-containing wastewater rich in oils and fats is always stored in the upper layer by utilizing the difference of the specific gravity between water and oils and fats, the oil- and fat-containing wastewater rich in oils and fats is absorbed via the two openings of the oil- and fat-containing wastewater collection container 94 and the opening of the containing housing 91 shown by the arrows indicated in FIG. 3 by the negative pressure of the underwater pump 92.

The oil- and fat-containing wastewater rich in oils and fats within the containing housing 91 is taken out into the present apparatus 100 via a water pipe 93 by means of the underwater pump 92. When the oil- and fat-containing wastewater is accumulated up to the position at the height approximately the same with the intake port 61, the liquid level sensor 84 senses and the incorporation of the oil- and fat-containing wastewater is stopped. At the same time, the aeration apparatus 80, the agitating apparatus 75 and the heater 83 are actuated and the aeration and the agitation of the oil- and fat-containing wastewater is initiated, and thereby the oil- and fat-containing wastewater is maintained at a predetermined temperature. Since the heating by means of the heater 83 is carried out when it is necessary for the purpose of the growth and activation of the microbe and the activation of the lipase. In this case, it is preferable that the temperature is in the range between 15° C. and 45° C., and it is more preferable that it is around 40° C. Moreover, as for the present apparatus 100, since the insulating material is interiorly provided, the heat retaining property has been enhanced.

The agitating apparatus 75 operates for a predetermined period and stops by means of a timer. In the present apparatus 100, since oils and fats are degraded up to about 80% for around 6 hours, it is not particularly limited, however, it is sufficient if the operating time of the agitating apparatus 75 is usually set to around 6 hours.

Even after the operation of the agitating apparatus 75 is stopped, the aeration apparatus 80 and the heater 83 operate continuously and fatty acid generated by degradation of oils and fats are further degraded into carbon dioxide gas and water by utilizing an microbe. After a predetermined time has elapsed, the electromagnetic valve 63 provided at the discharge port 62 is activated, the discharge port 62 becomes into an opened state, and the wastewater degraded and treated is discharged.

The series of the operations performed by the above-described present apparatus 100 are controlled by a circuit provided to the electric switchboard. Moreover, since the discharge port 62 of the present apparatus 100 is formed at the position that is about ¼ of the height of the container body 60 from the lower end, part of the wastewater still remains even after the wastewater containing the microbe has been discharged after it was degraded and treated. Since if the portion of oil and fat content within the grease trap G is left for a long period, it becomes scum and gives off a bad odor, it is preferable, that as a principle, the above-described series of operations are repeated in cycles of 24-hour duration. Owing to this, the microbe contained in the remaining wastewater is grown and activated by operating the aeration apparatus 80 and the heater 83 continuously, and the treatment of the oil- and fat-containing wastewater can be performed for one month without refilling. Moreover, the immobilized lipase E also does not get flown and lost from the enzyme holder 70 and the enzyme activity is maintained for about one month. The treated wastewater can be discharged into the discharge port at a kitchen or the like, however, it may be returned to the grease trap G and discharged therethrough. By discharging the treated wastewater via the grease trap G, in the case where there is no discharge port communicating with the sewage or the like, it is not necessary to additionally provide a discharge port, and the wastewater degraded and treated can be further diluted with water within the grease trap G and discharged.

Moreover, since on the bottom portion of the container body 60, a taper that gradually lowers towards the discharge port for maintenance 65 is formed, the wastewater stored within the container body 60 can be completely discharged from the discharge port for maintenance 65 by opening the drain valve, and the cleaning operations of inside of the present apparatus 100 is also easy, and moreover, there is no need to touch the contaminated wastewater, therefore, it is advantageous for maintenance.

The treatment of the wastewater was performed using the present apparatus 100 explained above. The microbe preparation was charged into the present apparatus 100 and the immobilized lipase E was charged into the enzyme holder 70.

The agitation was initiated by activating the agitating apparatus 75. At the same time with the agitation, the aeration apparatus 80 and the heater 83 were operated. After 6 hours have passed, the agitation was stopped and the sample for measurement was taken from the present apparatus 100, and the degradation ratio of the oils and fats was examined. The present apparatus 100 was continuously operated for 18 hours after the agitation was stopped.

The treatment conditions were as following:

The amount of the immobilized lipase E charged: 100 g, the size of mesh of the enzyme holder 60: 10 mesh, the number of revolutions of the agitating apparatus 65: 550 rpm, the introduced amount of the microbe preparation: 50 g, the operation time: 24 hours (out of 24 hours, the agitation was performed for 6 hours from the beginning), the treatment temperature: 40° C., the amount of oil and fat content charged: 600 g of salad oil to 100 L of water, the microbe preparation: Dinatreat 2000 (manufactured by ENVIRONMENTAL DYNAMICS, INC.)

Further, the immobilized lipase E introduced into the enzyme holder 70 was prepared as following: 500 g of Acurel (manufactured by Aczonovel, Co., Ltd.), which is a carrier, was weighed and taken into a polyethylene container of 40 L and 6.2 L of ethanol was added thereto, then the mixture was agitated sufficiently until the carrier becomes wet and submerged. After 3.7 L of ethanol was removed by decantation, 12.5 L of 0.1 M phosphoric acid buffer (monopotassium phosphate+disodium phosphate, pH7.0) was added and agitated for 30 minutes. Subsequently, it was filtered and separated with the net which has the same mesh size with the enzyme holder. After the filtration, 6.2 L of 0.1 M phosphoric acid buffer (pH7.0) containing 1,309 g of lipase AY "Amano" (Amano Enzyme, Co., Ltd., lipase activity 30,000 u/g) was added to the carrier, and agitated for 24 hours in the low temperature room (4 to 10° C.). After the agitation, again, it was filtered with the above-described net, and further, the vacuum drying (30° C., 24 to 48 hours, the drying state is determined at the time when 24 hours have passed) by electric isothermal vacuum drying machine (manufactured by Seikokagaku Manufacturing Co., Ltd.), and the immobilized lipase was obtained. The manufacture of the immobilized lipase was performed twice using this method and 580 g and 570 g, that is 1150 g in total, of the immobilized lipase was obtained. The average immobilization ratio of the immobilized lipase (total activity of lipase used for immobilization-total activity of unimmobilized lipase) was 50.2%. Moreover, the average enzyme titer of the immobilized lipase was 34,000 u/g. Furthermore, the average particle diameter of the immobilized lipase E was 3 mm, and the bulk specific gravity was 0.165.

As for the degradation ratio of oil and fat content, the acid value of oil and fat content was measured after it was degraded by the immobilized lipase E, and the acid value was divided by 195 and obtained as a percentage. The measurement of acid value was performed according to 23. Acid value (2.3.1-1996) of the Standard Test Method for Analysis of Oils and Fats (Edited by Japan Oil Chemist's Society, 1996).

The results are shown in Table 1. The oils and fats were degraded into fatty acid and glycerin at the degradation ratio of 92% by making the immobilized lipase E act for 6 hours while agitating the oil- and fat-containing wastewater. Moreover, concerning with the degraded fatty acid has been degraded completely into carbon dioxide and water 24 hours later by the activity of the microbe. It should be noted that as for n-hexane extract substance conversion amount (mg/L) in Table 1, the sample was measured by an iatroscan method

TABLE 1

| Working time of the present apparatus (h) | n-hexane extract substance conversion amount (mg/L) | | |
|---|---|---|---|
| | triglyceride | fatty acid | others |
| 0 | 1,000 | 0 | 0 |
| 6 | 47 | 918 | 37 |
| 24 | 29 | 0 | 30 |

According to the present apparatus 100 and the present treatment method, it has been clarified that the oils and fats of the oil- and fat-containing wastewater within the grease trap G can be more securely degraded into carbon dioxide gas and water, and moreover, it can be degraded and treated in a short time.

The invention claimed is:

1. An apparatus for treating oil- and fat-containing wastewater that degrades and treats the oils and fats of an oil- and fat-containing wastewater within a grease trap by means of the action of an immobilized lipase and a microbe that utilizes an organic matter, wherein said apparatus for treating oil- and fat-containing wastewater is equipped with a container body having an intake port for taking the oil- and fat-containing wastewater rich in oils and fats which has been separated and taken out and stored in the upper layer within the grease trap, and a discharge port formed in such a way that it can discharge while retaining part of the wastewater degraded and treated, an enzyme holder that is provided within the container body and that contains the immobilized lipase having a bulk specific gravity of 0.15 to 0.2 while preventing the lipase from being flown and lost, in which said oil- and fat-containing wastewater can freely pass through, and an agitating apparatus for agitating said oil- and fat-containing wastewater provided within the container body, the agitating apparatus having an agitating rod provided with an agitating blade that rotates in the enzyme holder while driven by a motor, and wherein said apparatus is provided and installed exterior of the grease trap.

2. The apparatus for treating oil- and fat-containing wastewater as claimed in claim 1, comprising separating means for separating the oil- and fat-containing wastewater rich in oils and fats which has been stored in the upper layer within the grease trap, wherein said separating means comprises a containing housing that is provided within the grease trap and that has an opening at the upper portion, an absorbing pump provided and contained within the containing housing, and an oil- and fat-containing wastewater collection container having an opening at the upper portion communicating with said containing housing, and the upper end of said containing housing and the upper end of said oil- and fat-containing wastewater collection container are disposed at the lower layer position of the predetermined oil- and fat-containing wastewater rich in the oils and fats to be separated.

3. The apparatus for treating oil- and fat-containing wastewater as claimed in claim 2, wherein said apparatus for treating oil- and fat-containing wastewater is equipped with air diffuser means and/or heating means.

4. A method for treating oil- and fat-containing wastewater that degrades and treats the oils and fats of an oil- and fat-containing wastewater within a grease trap by means of the action of an immobilized lipase and a microbe that utilizes an organic matter, the method comprising utilizing an apparatus for treating oil- and fat-containing wastewater which is equipped with a container body having an intake port for taking the oil- and fat-containing wastewater rich in oils and fats which has been separated and taken out and stored in the upper layer within the grease trap, and a discharge port formed in such a way that it can discharge while retaining part of the wastewater degraded and treated, an enzyme holder that is provided within the container body and that contains an immobilized lipase having a bulk specific gravity of 0.15 to 0.2 while preventing the lipase from being flown and lost, in which said oil- and fat-containing wastewater can freely pass through, and an agitating apparatus for agitating said oil- and fat-containing wastewater provided within the container body, the agitating apparatus having an agitating rod provided with an agitating blade that rotates in the enzyme holder while driven by a motor, and wherein said apparatus is provided and installed exterior of the grease trap.

5. The method for treating oil- and fat-containing wastewater as claimed in claim 4, wherein wastewater, after it has been degraded and treated is returned within a grease trap, and discharged to the sewage via the grease trap.

* * * * *